US012757023B2

(12) United States Patent
Gunjan et al.

(10) Patent No.: US 12,757,023 B2
(45) **Date of Patent: *Oct. 6, 2026**

(54) CELLULAR IoT SECURITY USING DYNAMIC POLICY-DRIVEN MECHANISMS FOR THREAT DETECTION AND ISOLATION

(71) Applicant: Netskope, Inc., Santa Clara, CA (US)

(72) Inventors: Milind Gunjan, Olathe, KS (US); Kallol Banerjee, San Jose, CA (US); Jonathan Bosanac, Ennis, MT (US)

(73) Assignee: Netskope, Inc., Santa Clara, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 19/044,404

(22) Filed: Feb. 3, 2025

(65) Prior Publication Data

US 2026/0032444 A1 Jan. 29, 2026

Related U.S. Application Data

(63) Continuation of application No. 18/783,154, filed on Jul. 24, 2024, now Pat. No. 12,219,360.

(51) Int. Cl.
*H04W 12/122* (2021.01)
*H04W 12/088* (2021.01)

(52) U.S. Cl.
CPC ....... *H04W 12/122* (2021.01); *H04W 12/088* (2021.01)

(58) Field of Classification Search
CPC ......................... G06F 21/577; G06F 2221/033
See application file for complete search history.

(56) References Cited

U.S. PATENT DOCUMENTS

| | | | |
|---|---|---|---|
| 6,513,122 | B1 | 1/2003 | Magdych et al. |
| 9,609,015 | B2 | 3/2017 | Natarajan et al. |

(Continued)

FOREIGN PATENT DOCUMENTS

| | | | |
|---|---|---|---|
| CN | 103716180 | A | 4/2014 |
| CN | 106657005 | | 5/2017 |

(Continued)

*Primary Examiner* — Viral S Lakhia
(74) *Attorney, Agent, or Firm* — MUGHAL GAUDRY & FRANKLIN PC

(57) ABSTRACT

A cellular security system that uses multiple policies to protect a cellular network against various threats in a cloud-based environment. The cellular security system includes a tenant with multiple cellular devices, multiple tunnels that receive and route traffic, monitor traffic, capture real-time traffic attributes, and detect anomalies. The cellular security system further includes an anomaly detection model, an alert generator, and an anomaly reporter. The anomaly detection model retrieves baseline profiles from a threat database, loads policies related to a threat, and compares real-time traffic features with baseline profiles. The anomaly detection model further applies an anomaly detection algorithm to a traffic instance, assigns an anomaly score, and raises a flag for anomaly detection where the anomaly score is greater than a threshold. The alert generator sends an alert to the tenant in the cloud-based environment, and the anomaly reporter notifies a management plane for further remediation of the anomaly.

20 Claims, 11 Drawing Sheets

(56) References Cited

U.S. PATENT DOCUMENTS

| | | | | |
|---|---|---|---|---|
| 9,923,911 | B2 | 3/2018 | Vasseur et al. | |
| 10,015,178 | B2 | 7/2018 | Schulman et al. | |
| 10,122,740 | B1 | 11/2018 | Finkelshtein et al. | |
| 10,220,167 | B2 | 3/2019 | Mermoud et al. | |
| 10,237,282 | B2 | 3/2019 | Nelson et al. | |
| 10,432,661 | B2 | 10/2019 | Vasseur et al. | |
| 10,439,904 | B2 | 10/2019 | Deen et al. | |
| 11,580,094 | B2 | 2/2023 | Beilis et al. | |
| 11,876,821 | B1 | 1/2024 | Pratt et al. | |
| 12,166,801 | B2 * | 12/2024 | Shaw | H04L 63/1425 |
| 12,184,687 | B1 * | 12/2024 | Havdala | H04L 63/1425 |
| 12,207,092 | B2 * | 1/2025 | Kaushik | H04L 63/1491 |
| 12,231,403 | B2 * | 2/2025 | Devarajan | H04L 67/10 |
| 12,245,036 | B1 * | 3/2025 | Banerjee | H04W 8/20 |
| 12,341,750 | B2 * | 6/2025 | Zachos | H04W 12/121 |
| 12,500,870 | B2 * | 12/2025 | Crabtree | H04L 63/0428 |
| 2008/0250497 | A1 | 10/2008 | Mullarkey et al. | |
| 2018/0234444 | A1 | 8/2018 | Kaplan et al. | |
| 2019/0081973 | A1 | 3/2019 | Savalle et al. | |
| 2022/0239675 | A1 | 7/2022 | Panse et al. | |
| 2022/0382833 | A1 | 12/2022 | Riddle et al. | |
| 2023/0164567 | A1 * | 5/2023 | Fellows | H04L 63/1425 455/410 |
| 2024/0129740 | A1 * | 4/2024 | Pathania | H04L 63/1416 |
| 2024/0314169 | A1 * | 9/2024 | Azad | H04L 63/1416 |

FOREIGN PATENT DOCUMENTS

| | | | |
|---|---|---|---|
| CN | 114448830 | A | 5/2022 |
| CN | 115811487 | A | 3/2023 |
| KR | 100974888 | B1 | 8/2010 |

* cited by examiner

CELLULAR IoT SECURITY USING DYNAMIC POLICY-DRIVEN MECHANISMS FOR THREAT DETECTION AND ISOLATION

PRIORITY

This is a continuation of U.S. Non-Provisional application Ser. No. 18/783,154, filed Jul. 24, 2024, now U.S. Pat. No. 12,219,360, issued Feb. 4, 2025, which is incorporated by reference for all purposes.

BACKGROUND

This disclosure relates, in general, to internet security and data protection systems and, not by way of limitation, to threat mitigation at cellular devices, among other things.

The propagation of cellular devices has transformed communication and access to information, but it has also introduced a variety of security challenges. As mobile devices become increasingly innate to personal and professional life, they also become attractive targets for cyber threats. The prevalent security threats to mobile devices include malware, which can be downloaded through malicious apps or websites, leading to data theft or loss. Phishing attacks, often carried out through deceptive emails or texts, aim to trick individuals into revealing sensitive information. Network-based threats exploit unsecured Wi-Fi connections to intercept data, while physical threats such as device theft or loss pose a risk to the data stored on the device.

Furthermore, mobile cloud computing models have a prerequisite for robust data security frameworks to safeguard against privacy breaches and unauthorized access. Effective security policies have to encompass not just the technical controls but also address human factors and the complexity of interconnected systems to create a strong defense against evolving threats.

SUMMARY

In one embodiment, the present disclosure provides a cellular security system that uses multiple policies to protect a cellular network against various threats in a cloud-based environment. The cellular security system includes a tenant with multiple cellular devices, multiple tunnels that receive and route traffic, monitor traffic, capture real-time traffic attributes, and detect anomalies. The cellular security system further includes an anomaly detection model, an alert generator, and an anomaly reporter. The anomaly detection model retrieves baseline profiles from a threat database, loads policies related to a threat, and compares real-time traffic features with baseline profiles. The anomaly detection model further applies an anomaly detection algorithm to a traffic instance, assigns an anomaly score, and raises a flag for anomaly detection where the anomaly score is greater than a threshold. The alert generator sends an alert to the tenant in the cloud-based environment, and the anomaly reporter notifies a management plane for further remediation of the anomaly.

In an embodiment, a cellular security system that uses multiple policies to protect a cellular network against various threats in a cloud-based environment. The cellular security system includes a tenant with multiple cellular devices, multiple tunnels that receive and route traffic, monitor traffic, capture real-time traffic attributes, and detect anomalies. The cellular security system further includes an anomaly detection model, an alert generator, and an anomaly reporter. The anomaly detection model retrieves baseline profiles from a threat database, loads policies related to a threat, and compares real-time traffic features with baseline profiles. The baseline profiles are created by analyzing the policies, traffic patterns, and device types associated with the tenants. The anomaly detection model further applies an anomaly detection algorithm to a traffic instance, assigns an anomaly score, and raises a flag for anomaly detection. The anomaly detection algorithm can be statistical models, machine learning algorithms, clustering techniques, and rule-based approaches etc. The flag for detection of the anomaly is raised when the anomaly score of the traffic instance associated with the cellular device crosses a threshold. The alert generator sends an alert to the tenant in the cloud-based environment, and the anomaly reporter notifies a management plane for further remediation of the anomaly. The management plane analyzes the anomaly, correlates the anomaly with the threat database, and gets confirmation of the threat. Upon confirmation of the threat, the management plane further initiates a quarantined traffic where a quarantined traffic module enables a security action based on a threat level of the threat. And initiates an isolation of cellular device affected from the threat based on the threat level. And sends a request to update a network identifier for the quarantined traffic, accesses severity of the threat, updates the threat database with new anomaly patterns and results in real-time based on new traffic patterns, feedback, and evolving threat, and periodically updates the anomaly detection algorithm used by the anomaly detection model based on the updated threat database.

In an embodiment, a method for providing cellular security using multiple policies to protect a cellular network against various threats in a cloud-based environment. In one step, the method for providing cellular security includes receiving and routing traffic, monitoring traffic, capturing real-time traffic attributes, and detecting anomalies. The method for providing cellular security further includes an anomaly detection model for retrieving baseline profiles from a threat database, loading policies related to a threat, and comparing real-time traffic features with baseline profiles. The baseline profiles are created by analyzing the policies, traffic patterns, and device types associated with the tenants. The anomaly detection model further applies an anomaly detection algorithm to a traffic instance, assigns an anomaly score, and raises a flag for anomaly detection. The anomaly detection algorithm can be statistical models, machine learning algorithms, clustering techniques, and rule-based approaches etc. The flag for detection of the anomaly is raised when the anomaly score of the traffic instance associated with the cellular device crosses a threshold. The method for providing cellular security sends an alert to the tenant in the cloud-based environment and notifies a management plane for further remediation of the anomaly. The management plane analyzes the anomaly, correlates the anomaly with the threat database, and gets confirmation of the threat. Upon confirmation of the threat, the management plane further initiates a quarantined traffic where a quarantined traffic module enables a security action based on a threat level of the threat. And initiates an isolation of cellular device affected from the threat based on the threat level. And sends a request to update a network identifier for the quarantined traffic, accesses severity of the threat, updates the threat database with new anomaly patterns and results in real-time based on new traffic patterns, feedback, and evolving threat, and periodically updates the anomaly detection algorithm used by the anomaly detection model based on the updated threat database.

In yet another embodiment, a computer-readable media is discussed having computer-executable instructions embodied thereon that when executed by one or more processors, facilitate a method for providing cellular security using multiple policies to protect a cellular network against various threats in a cloud-based environment. In one step, the method for providing cellular security includes receiving and routing traffic, monitoring traffic, capturing real-time traffic attributes, and detecting anomalies. The method for providing cellular security further includes an anomaly detection model for retrieving baseline profiles from a threat database, loading policies related to a threat, and comparing real-time traffic features with baseline profiles. The baseline profiles are created by analyzing the policies, traffic patterns, and device types associated with the tenants. The anomaly detection model further applies an anomaly detection algorithm to a traffic instance, assigns an anomaly score, and raises a flag for anomaly detection. The anomaly detection algorithm can be statistical models, machine learning algorithms, clustering techniques, and rule-based approaches etc. The flag for detection of the anomaly is raised when the anomaly score of the traffic instance associated with the cellular device crosses a threshold. The method for providing cellular security sends an alert to the tenant in the cloud-based environment and notifies a management plane for further remediation of the anomaly. The management plane analyzes the anomaly, correlates the anomaly with the threat database, and gets confirmation of the threat. Upon confirmation of the threat, the management plane further initiates a quarantined traffic where a quarantined traffic module enables a security action based on a threat level of the threat. And initiates an isolation of cellular device affected from the threat based on the threat level. And sends a request to update a network identifier for the quarantined traffic, accesses severity of the threat, updates the threat database with new anomaly patterns and results in real-time based on new traffic patterns, feedback, and evolving threat, and periodically updates the anomaly detection algorithm used by the anomaly detection model based on the updated threat database.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Figure 1:
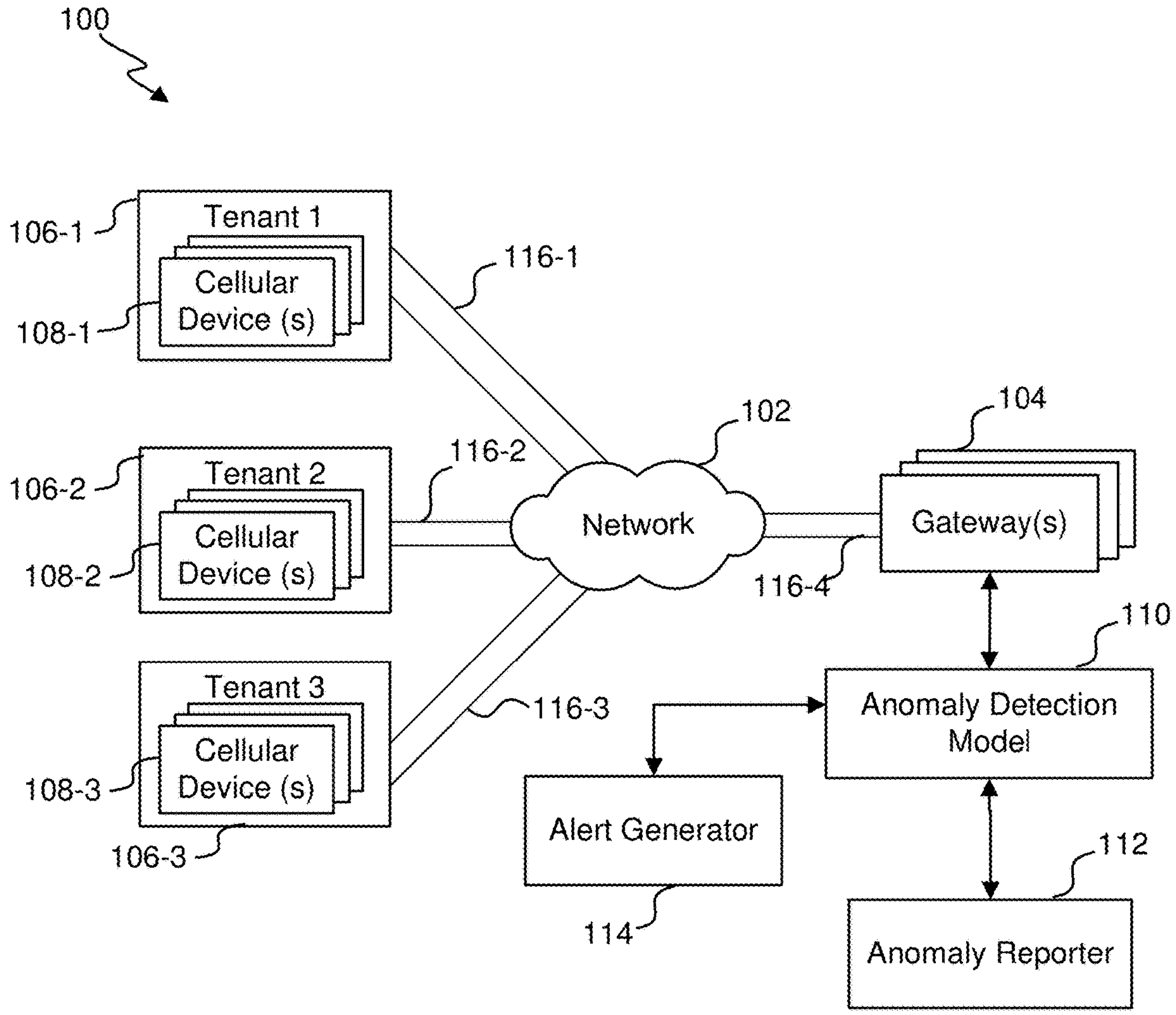
FIG. 1 illustrates a block diagram of an embodiment of a cellular security system to protect a cellular network against threats in a cloud-based environment.

Referring to FIG. 1, a block diagram of an embodiment of a cellular security system 100 to protect a cellular network against threats in a cloud-based environment is shown. The cellular security system 100 is targeted towards organizations utilizing medium to large deployments of subscriber identity module (SIM)/embedded SIM (eSIM)/integrated SIM (iSIM) enabled IoT devices, such as in exigent infrastructure, industrial settings, smart cities, and connected healthcare systems. For these applications, maintaining robust network security against IoT-based threats is of supreme importance.

The cellular security system 100 provides a dynamic solution to protect networks from the inimitable challenges posed by IoT devices. It enhances network security by offering effective mechanisms for the quick identification and isolation of compromised IoT devices. The cellular security system 100 works at a hypervisor (data-link) layer of a cloud open systems interconnection (OSI) model. By integrating advanced security features such as access restrictions, policy-driven data loss prevention (DLP), event-based security policy implementation via deep service inspection using secure access service edge (SASE), anomaly detection by behavioral traffic profiling, and a tiered response strategy, the cellular security system 100 fulfills exigency for a robust, scalable, and intelligent security framework. The real-time threat response capability reduces potential damage without shutting down the network, while the advanced threat intelligence feature ensures continuous improvement in security measures and preparedness against evolving cyber threats.

The cellular security system 100 includes a network 102, gateways 104, tenants 106 (106-1, 106-2, 106-3), cellular devices 108 (108-1, 108-2, 108-3), and tunnels 116 (116-1, 116-2, 116-3, 116-4). The cellular security system further includes an anomaly detection model 110, an anomaly reporter 112, and an alert generator 114. The network 102 is a cellular network connecting the tenants 106 and transmitting traffic between the cellular devices 108 and the gateways 104. From here on, the terms "cellular network" and "network" are used interchangeably. The tenant 106 links with multiple cellular devices that access the applications provided on the network 102. The cellular devices 108 are portable electronic devices that use cellular network technology to enable wireless communication. The cellular devices 108 encompasses a wide range of gadgets, including smartphones, tablets, and particular types of computers. These devices can make and receive calls, transmit data, and access the internet. They operate over a network of cells, individually served by a base station, allowing for seamless communication even when the user is on the move. In this application, the SIM/eSIM/iSIM-enabled IoT devices are referred to as "cellular devices" from hereon.

The tunnels 116 of the cellular security system 100 are IPsec tunnels that are used to secure network communications. This provides a means to establish encrypted connections across public networks. Traffic incoming from different tenants remains separated in the tunnels 116. IPsec is a suite of protocols designed to ensure the confidentiality, integrity, and authenticity of data packets as they travel over the internet or other untrusted networks. It operates by encrypting and encapsulating IP packets, effectively creating a tunnel through which data can pass securely. This is particularly useful for virtual private networks (VPNs), where sensitive information has to be protected from potential interception. Furthermore, the tunnels 116 receive traffic from the cellular device 108 at the cellular network and route traffic to the gateway 104 using network identifiers. The tunnels 116 also monitor traffic coming from the cellular device 108 at the gateway 104 and capture real-time traffic attributes and relevant features from the traffic.

The gateways 104 in a cellular network serve as the point of interconnection where data is translated and transferred between disparate network protocols. The gateways 104 are responsible for tasks such as authentication, routing, and packet optimization, which are cardinal for the operation of 3G, 4G, and 5G networks. The gateways 104 ensure that the cellular devices 108 can connect to the core network and that data can flow smoothly and securely from one part of the network to another. The gateways 104 also manage the traffic that enters and exits the network, maintaining the integrity and efficiency of the communication processes within the cellular network infrastructure.

The anomaly detection model 110 distinguishes malicious activities and threats in the traffic by applying different policies. The anomaly detection model 110 applies an anomaly detection algorithm to different traffic instances and assigns an anomaly score to individual traffic instance. Upon detection of a malicious entity or threat in the traffic, the anomaly detection model 110 raises a flag to initiate further investigation of the threat.

The anomaly reporter 112 takes input from the anomaly detection model 110 to notify a management plane for further remediation of the anomaly. Finally, the alert generator 114 sends information about the threat to alert the tenants 106 in the cloud-based environment.

Figure 2:
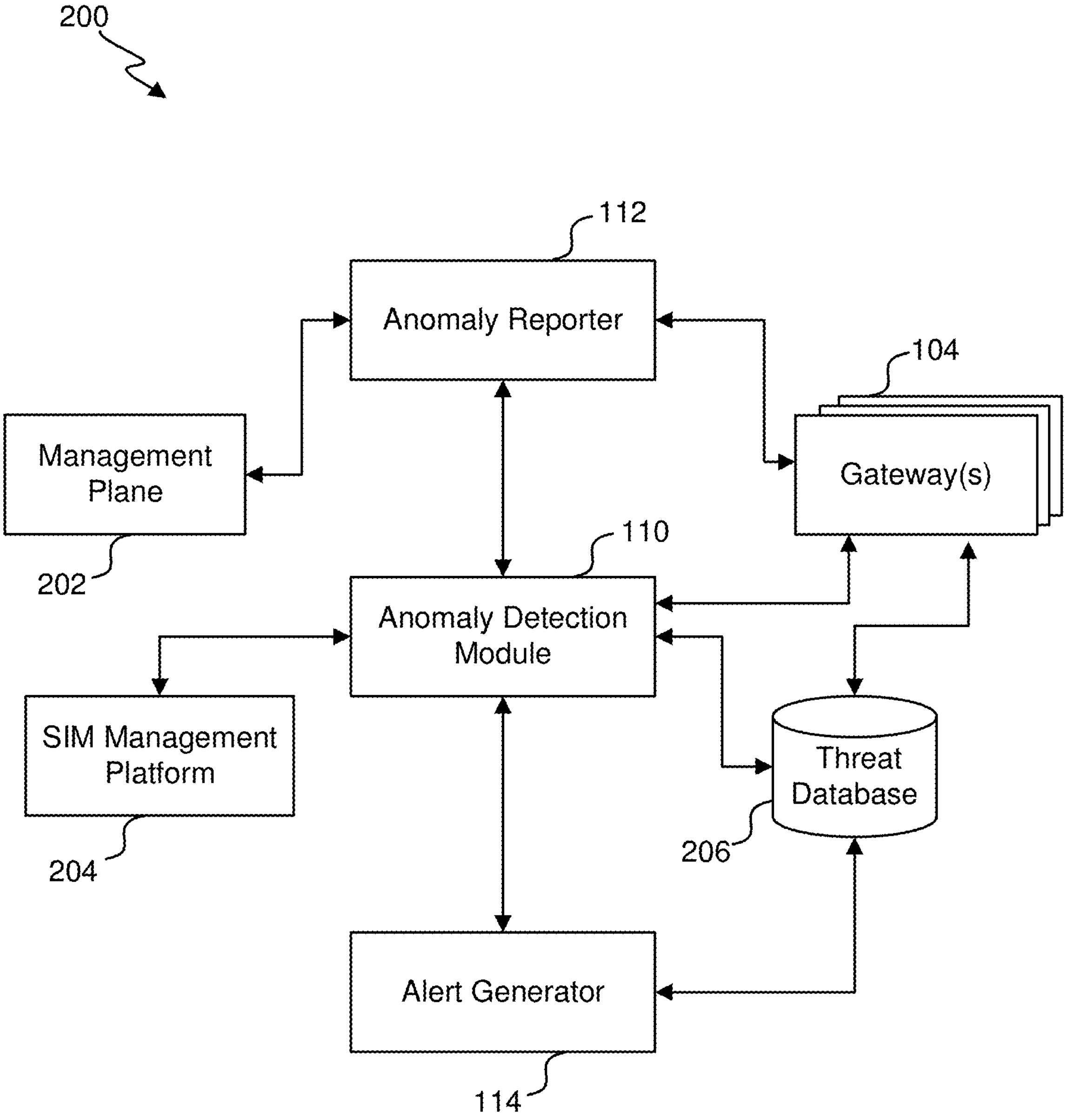
FIG. 2 illustrates a block diagram of different components of the cellular security system.

Referring next to FIG. 2, a block diagram of different components 200 of the cellular security system 100 is shown. The components interact seamlessly to provide a multi-layered security approach. The security service edge (SSE) and cellular device traffic profiling components continuously monitor network traffic for anomalies. Upon detecting a potential threat, the cellular security system 100 triggers the quarantine access point name (APN)/data network name (DNN) configuration, isolating the suspicious devices from the main network. The isolated traffic is then analyzed within the secure DLP environment, which applies relevant security policies and enforces DLP measures to prevent unauthorized data exfiltration. Based on the severity of the threat, the event-driven quarantine and response component escalates the appropriate mitigation strategies, ranging from limited quarantine measures to comprehensive isolation and remediation actions.

The adaptive capabilities of the cellular security system 100 are further enhanced by the subscriber/SIM management and cellular system integration component, which allows for real-time updates and adjustments to security policies, as well as executing actions like suspending, reactivating, or deactivating SIMs and updating APN/DNN configurations based on the observed threat landscape.

The components of the cellular security system 100 include an anomaly detection model 110, gateways 104, an anomaly reporter 112, and an alert generator 114. The components of the cellular security system 100 further include a management plane 202, a SIM management platform 204, and a threat database 206. The anomaly detection model 110 integrates DLP mechanisms to create a secure and controlled environment for analyzing suspicious traffic. The anomaly detection model 110 monitors and prevents unauthorized data exfiltration, providing an additional layer of protection against potential data breaches. When suspicious traffic is detected by the SSE, the anomaly detection model 110 works in tandem with the SASE to apply quarantine policies, isolating and analyzing the traffic within a secure environment while enforcing DLP measures.

The anomaly detection model 110 focuses on the security services side of the SASE model, acting as the frontline security gateway. It monitors and analyzes whole data traffic from the cellular devices 108 in real-time, employing advanced security functions like deep packet inspection, URL classification, service functionality access restriction, intrusion detection, and AI-driven anomaly detection to identify potential threats. The SSE inspects the cellular traffic as it enters the network, flagging any suspicious or anomalous activity for further action by other system components.

The anomaly detection model 110 retrieves baseline profiles of the tenants 106 from the threat database 206 and loads policies related to the threat. The anomaly detection model 110 then compares real-time traffic features with the baseline profiles and applies an anomaly detection algorithm to a traffic instance. The traffic instance being analyzed is then assigned with an anomaly score. If the anomaly score crosses a set threshold for a particular tenant, the anomaly detection model 110 raises a flag for the detection of the anomaly.

The management plane 202 allows for the centralized configuration, monitoring, and enforcement of security policies across a cellular network. This approach simplifies the management of security policies, ensuring that they are consistently applied to complete devices, regardless of their location. By leveraging the management plane 202, the tenants 106 can streamline their security operations, reduce the complexity of managing numerous devices, and respond more swiftly to security threats. The management plane 202 enhances visibility and control over the network, enabling administrators to implement and adjust policies with ease and precision. The anomaly reporter 112 transports information about the anomaly to the management plane 202. The management plane 202 analyzes the anomaly and correlates it with the threat database 206 to get confirmation of the threat. This reduces the risk of entertaining a false positive generated by the anomaly detection model 110.

The management plane 202 further coordinates with the gateways 104 to mitigate the threat, assess the severity of the threat, and take action to remediate the threat or malicious entities from the cellular network. The management plane 202 also updates the threat database 206 with new anomaly patterns and investigation results in real-time based on new traffic patterns, feedback, and evolving threat landscapes. This, in return, updates the anomaly detection algorithm used by the anomaly detection model 110.

The integration with cellular networks, facilitated through secure APIs from the tunnels 116 and the SIM management platform 204, represents leveraging contextual information and sharing security intelligence through a feedback loop. This feedback loop fosters a more informed and effective threat detection and response strategy, allowing for actions such as suspending, reactivating, or deactivating SIMs, as well as updating APN/DNN configurations based on detected threats. The SIM management platform 204 manages and enforces security policies at the SIM level for the cellular devices 108. The SIM management platform 204 leverages secure SIM technology to ensure that device-level security policies align with the broader network security posture. Additionally, the SIM management platform 204 facilitates bi-directional communication and integration with the cellular network infrastructure through secure APIs.

The SIM management platform 204 interacts with the SSE, SASE, and the anomaly detection model 110 to receive and enforce security policies tailored for individual cellular devices based on their risk profiles, device types, and network contexts. It also exchanges security intelligence and policy updates with the cellular network, enabling real-time updates and adjustments to security measures. Through the SIM management platform 204, actions such as suspending, reactivating, or deactivating SIMs, as well as updating APN/DNN configurations, can be executed based on detected threats.

The traffic patterns, thresholds, feedback on the threat detection, baseline profiles of the tenants 106, and threat landscapes are stored in the threat database 206. In one embodiment, the threat database 206 provides historical data for the training of a machine learning based anomaly detection algorithm. The threat database 206 is periodically updated by the management plane 202 to keep up with the evolving threat landscape across the cellular network.

Figure 3:
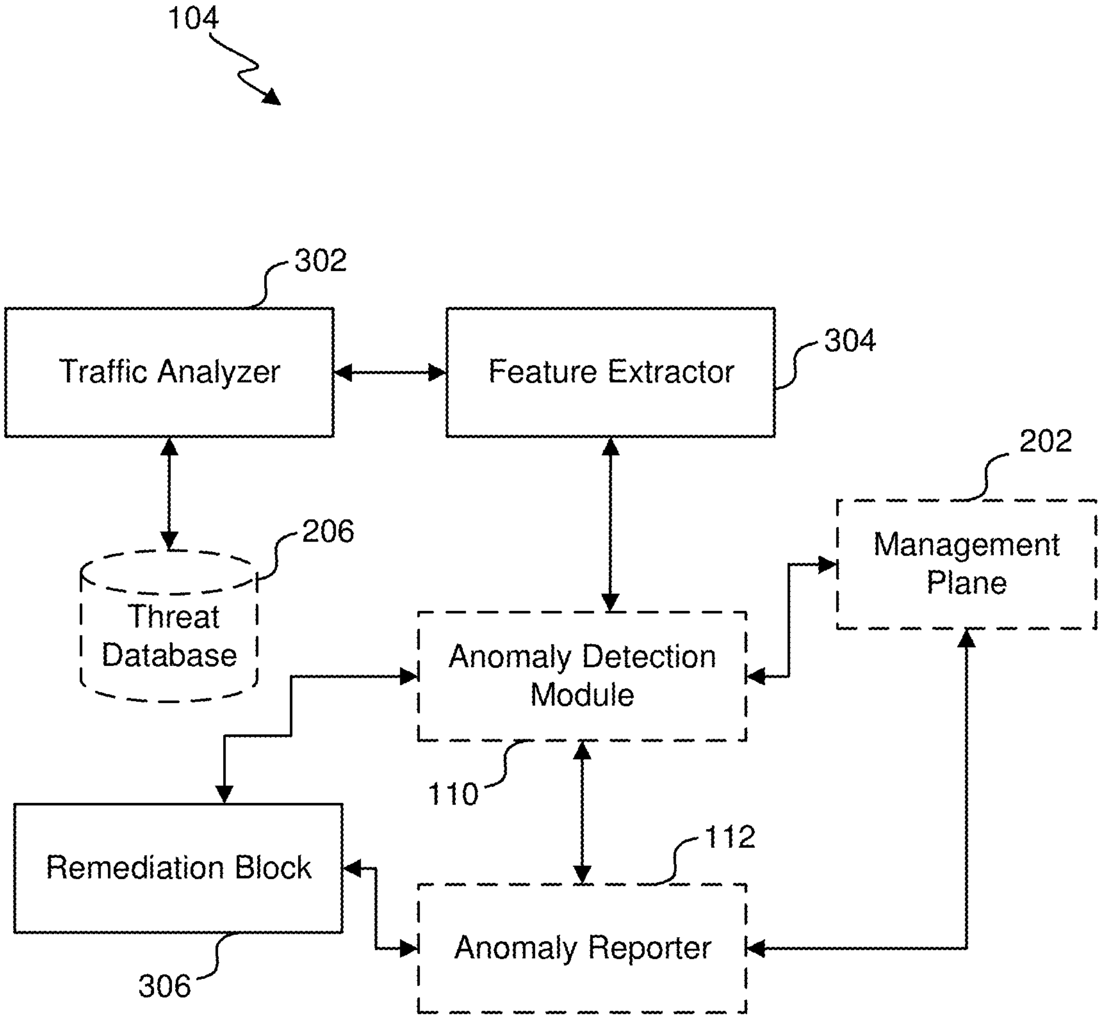
FIG. 3 illustrates a block diagram of analyzing traffic at a gateway.

Referring next to FIG. 3, a block diagram analyzing traffic at the gateway 104 is shown. The gateway 104 consists of a traffic analyzer 302, a feature extractor 304, and a remediation block 306. The traffic analyzer 302 monitors SASE/SSE traffic on the cellular devices 108. The feature extractor 304 captures real-time traffic attributes, pre-processes the captured traffic data and extracts features related to a policy. The feature extractor 304 forwards traffic to the anomaly detection model 110, where the traffic is analyzed against policies and baseline profiles to find the anomaly.

Upon detection of the anomaly, the gateway 104 generates an alert and the anomaly reporter 112 reports it to the management plane 202. The management plane 202 sends back a quarantined traffic and a threat intelligence to the gateway 104 after investigation. The threat intelligence of the recently detected threats is stored in the threat database 206. The gateway 104 then analyzes the quarantined traffic at the traffic analyzer 302 to detect any exfiltration of the data. If data exfiltration is detected, the remediation block 306 of the gateway 104 blocks the exfiltration attempt at the cellular device 108. Finally, the gateway 104 reports the result or analysis of the exfiltration attempt to the management plane 202.

Figure 4:
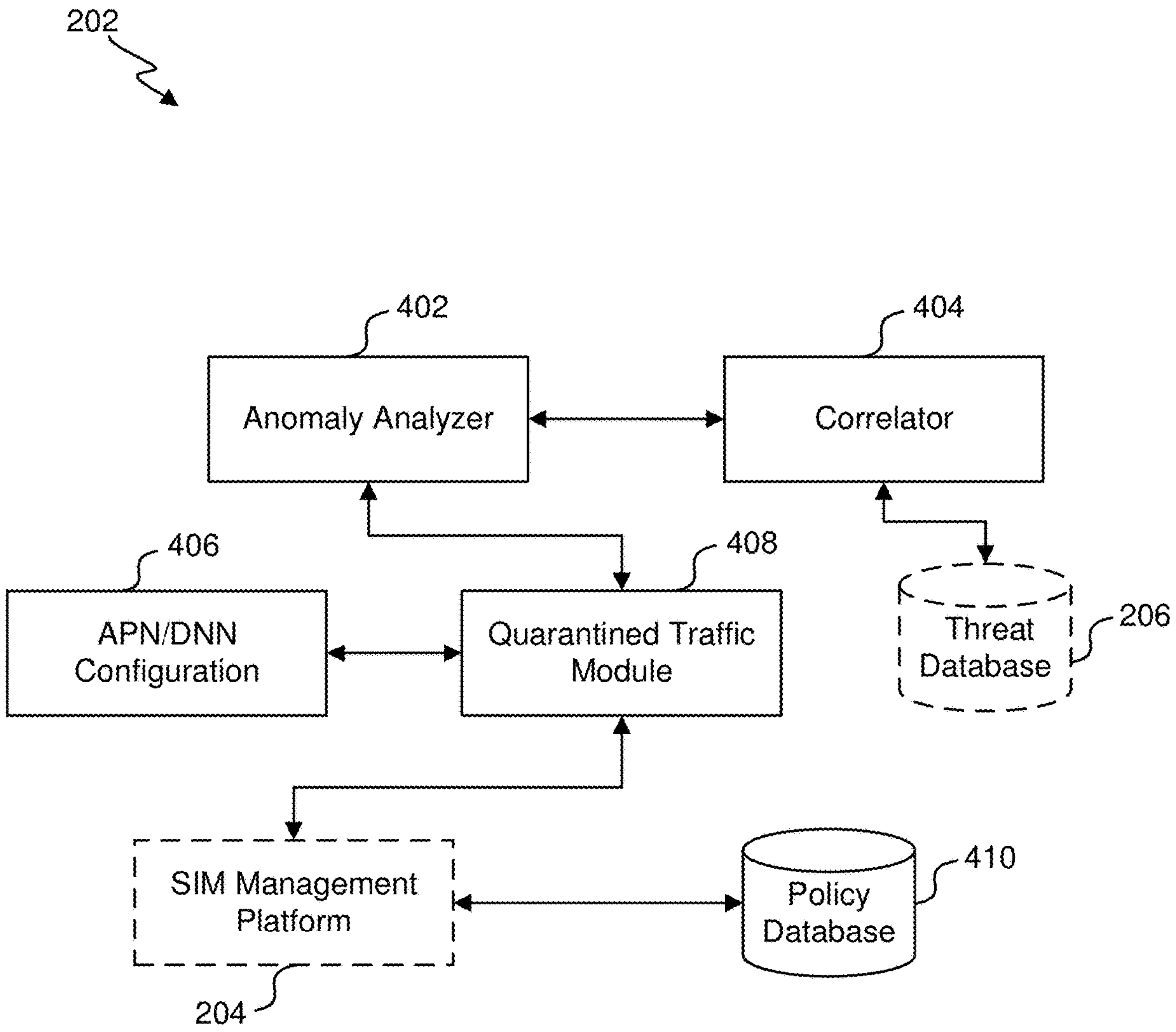
FIG. 4 illustrates a block diagram of a management plane mitigating threats in the cloud-based environment.

Referring next to FIG. 4, a block diagram of the management plane 202 mitigating threat in the cloud-based environment is shown. The management plane 202 allows centralized management of security policies, ensuring that they are consistently applied to complete devices, regardless of their location. The management plane 202 includes an anomaly analyzer 402, a correlator 404, an APN/DNN configuration 406 block, a quarantined traffic module 408, and a policy database 410. The anomaly analyzer 402 examines the flag that was raised for the anomaly by the anomaly detection model 110. The correlator 404 compares the anomaly with the threat intelligence stored in the threat database 206. This is done to prevent the risk of entertaining a false positive. If the threat is confirmed by the correlator 404 and the anomaly analyzer 402, the quarantined traffic module 408 initiates a quarantine for a traffic instance. This quarantine initiation is an act of policy enforcement on a traffic instance and to segregate the malicious traffic from the regular traffic at the cellular network. In response to detected threats, a new quarantine APN/DNN configuration is pushed to the affected devices, effectively isolating them from the rest of the network.

The management plane 202 then requests the SIM management platform 204 to update the network identifiers APN/DNN of the quarantined traffic. APN is used in 3G and 4G networks to connect the cellular device 108 to the internet, while DNN serves a similar purpose in 5G networks. The SIM management platform 204 updates Quarantine_APN/DNN in the cellular network at the APN/DNN configuration 406 block. The APN/DNN configuration 406 block directs cellular traffic from secure SIMs over IPsec VPN tunnels into the SSE/SASE system for initial screening and subsequent actions based on the traffic's nature.

The quarantined traffic module 408 interacts directly with the cellular devices 108, altering their network settings to reroute their traffic away from the main/enterprise network and into a controlled environment for further analysis. The quarantined traffic module 408 enables event-driven security actions based on the severity of detected threats. It defines a tiered response mechanism, where mild threats may trigger limited quarantine measures, while severe threats can initiate more comprehensive isolation and mitigation strategies. The event-driven quarantine and response system interacts directly with the SSE, SASE, and DLP components, dynamically adjusting security policies and enforcing appropriate isolation measures based on the detected threat level.

When the network identifiers for the quarantined traffic i.e., Quarantine_APN/DNN are updated, the cellular network applies it to the affected cellular devices. As a result, a new quarantine APN/DNN configuration is pushed to the affected devices, effectively isolating them from the rest of the network. The cellular device 108 sends the quarantined traffic to the cellular network. The cellular network routes the quarantined traffic to the gateway 104.

The management plane 202 also receives analysis report on the data exfiltration by the cellular device 108. From this report, the management plane 202 assesses the severity of the threat. For this purpose, the management plane 202 loads the policies related to the threat from the policy database 410. If the threat is classified as a severe threat by the policies, the management plane 202 instructs the SIM management platform 204 to suspend or stop the subscriber of that SIM. The SIM management platform 204 suspends/stops the subscriber in the cellular network, and the cellular network suspends/stops data connectivity for that cellular device.

On the other hand, if the threat is classified as a mild threat by the policies, the management plane 202 instructs the SIM management platform 204 to restart the subscriber of that SIM with limited connectivity. The SIM management platform 204 restarts the subscriber with limited_APN/DNN in the cellular network, and the cellular network applies limited_APN/DNN to that cellular device.

Finally, the SIM management platform 204 updates policies related to the newly assigned network identifiers in the policy database 410. The management plane 202 updates the threat intelligence with new anomaly patterns at the threat database 206 and propagates it to the gateway 104.

Figure 5:
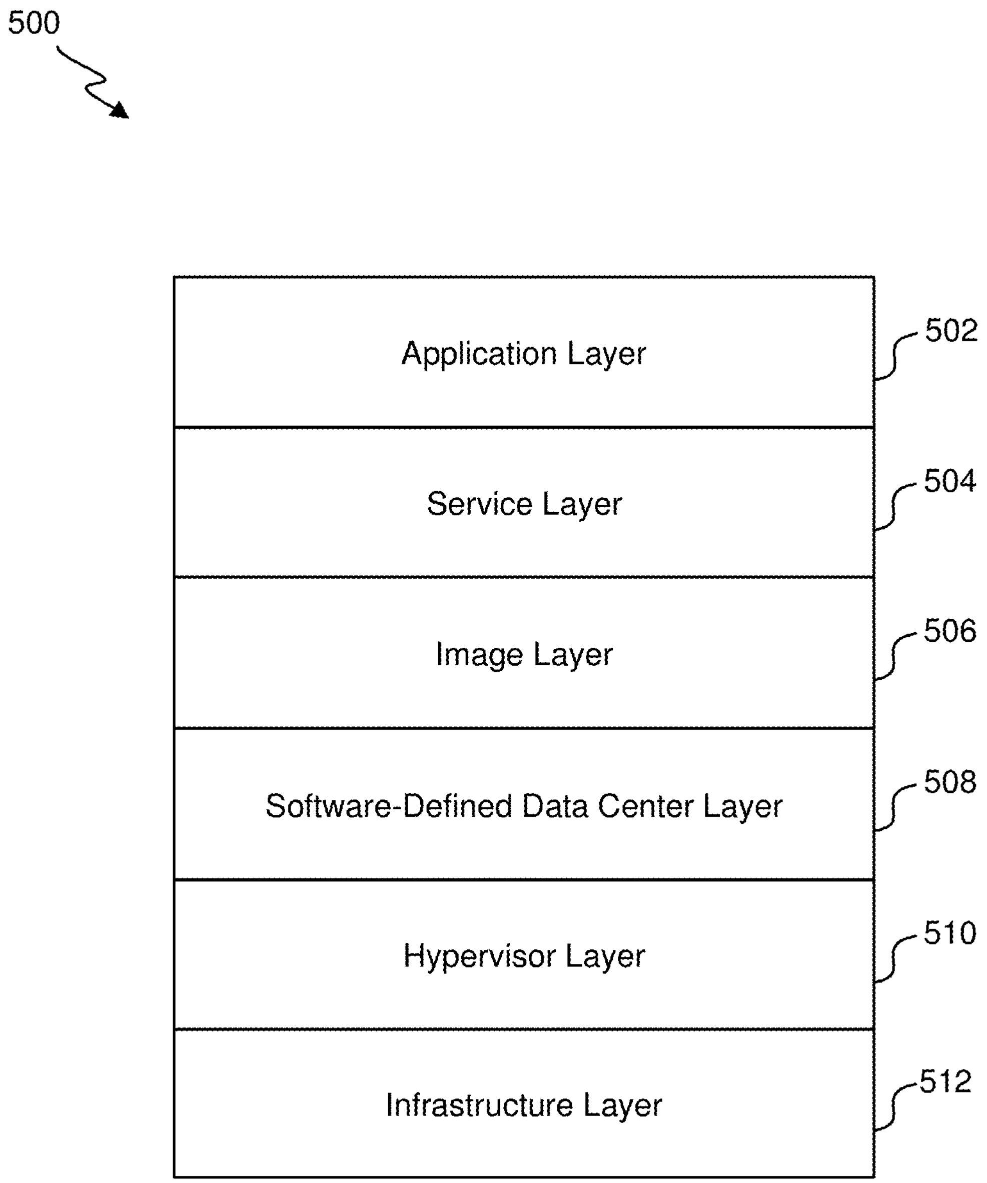
FIG. 5 illustrates a block diagram of an embodiment of a cloud open systems interconnection (OSI) model.

Referring next to FIG. 5, a block diagram of an embodiment of a cloud open systems interconnection (OSI) model 500 is shown. The cloud OSI model 500 for cloud computing environments partitions the flow of data in a communication system into six layers of abstraction. The cloud OSI model 500 for cloud computing environments can include, in order: an application layer 502, a service layer 504, an image layer 506, a software-defined data center layer 508, a hypervisor layer 510, and an infrastructure layer 512. The respective layer serves a class of functionality to the layer above it and is served by the layer below it. Classes of functionality can be realized in software by various communication protocols.

The infrastructure layer 512 can include hardware, such as physical devices in a data center, that provides the foundation for the rest of the layers. The infrastructure layer 512 can transmit and receive unstructured raw data between a device and a physical transmission medium. For example, the infrastructure layer 512 can convert the digital bits into electrical, radio, or optical signals.

The hypervisor layer 510 can perform virtualization, which can permit the physical devices to be divided into virtual machines that can be bin-packed onto physical machines for greater efficiency. The hypervisor layer 510 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

In the traditional OSI model, the data link layer is responsible for node-to-node data transfer and error handling within the same network segment. When considering the cloud OSI model, which adapts the traditional layers to fit cloud computing environments, the equivalent of the data link layer could be seen as part of the hypervisor layer. The hypervisor layer in the cloud OSI model deals with virtualization, providing virtual network interface cards (NICs) for virtual machines (VMs) that interact with the data link layer's functions. It manages the virtual switches that handle data traffic between VMs, ensuring that the data link layer protocols are adhered to for accurate communication within the virtualized environment. This layer ensures that the cloud infrastructure maintains the mechanisms pertinent to data transfer and reliability, akin to the data link layer's role in the traditional model. Understanding this correspondence is cardinal for network professionals working with cloud-based technologies.

The software-defined data center layer 508 can provide resource pooling, usage tracking, and governance on top of the hypervisor layer 510. The software-defined data center layer 508 can enable the creation of virtualization for the Infrastructure-as-Code concept by using representational state transfer (REST) application programming interfaces (APIs). The management of block storage devices can be virtualized, and users can be provided with a self-service API to request and consume those resources which do not entail any knowledge of where the storage is deployed or on what type of device. Various compute nodes can be balanced for storage.

The image layer 506 can use various operating systems and other pre-installed software components. Patch management can be used to identify, acquire, install, and verify patches for products and systems. Patches can be used to rectify security and functionality problems in software. Patches can also be used to add new features to operating systems, including security capabilities. The image layer 506 can focus on the computing in place of storage and networking. The instances within the cloud computing environments can be provided at the image layer 506.

The service layer 504 can provide middleware, such as functional components that applications use in tiers. In some examples, the middleware components can include databases, load balancers, web servers, message queues, email services, or other notification methods. The middleware components can be defined at the service layer 504 on top of specific images from the image layer 506. Different cloud computing environment providers can have different middleware components. The application layer 502 can interact with software applications that implement a communicating component. The application layer 502 is the layer that is closest to the user. Functions of the application layer 502 can include identifying communication partners, determining resource availability, and synchronizing communications. Applications within the application layer 502 can include custom code that makes use of middleware defined in the service layer 504.

Various features discussed above can be performed at multiple layers of the cloud OSI model 500 for cloud computing environments. For example, translating the general policies into specific policies for different cloud computing environments can be performed at the service layer 504 and the software-defined data center layer 508. Various scripts can be updated across the service layer 504, the image layer 506, and the software-defined data center layer 508. Further, APIs and policies can operate at the software-defined data center layer 508 and the hypervisor layer 510.

Different cloud computing environments can have different service layers, image layers 506, software-defined data center layers 508, hypervisor layers 510, and infrastructure layers 512. Further, respective cloud computing environments can have the application layer 502 that can make calls to the specific policies in the service layer 504 and the software-defined data center layer 508. The application layer 502 can have noticeably the same format and operation for respective different cloud computing environments. Accordingly, developers for the application layer 502 are not obliged to understand the peculiarities of how respective cloud computing environments operate in the other layers.

Figure 6:
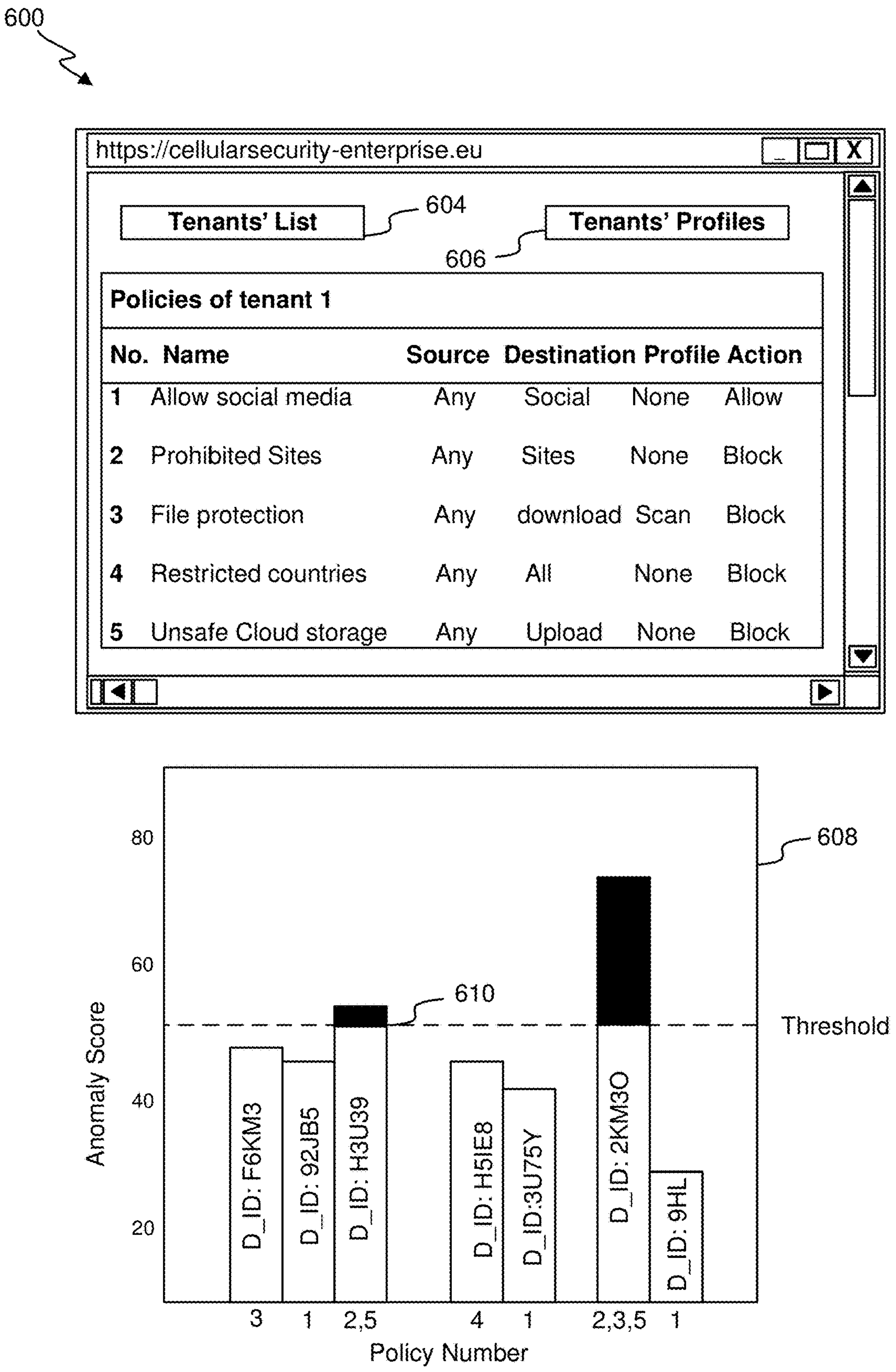
FIG. 6 illustrates a GUI representation of a tenant policy and a graphical representation of anomaly scores of different cellular devices along with the policies that were breached.

Referring next to FIG. 6, a GUI 600 representation of a tenant policy and graphical representation 608 of anomaly scores of different cellular devices, along with the policies that were breached are shown. The policies of one tenant are different from the policies of the other tenant, and the cellular devices 108 associated with a tenant are scored based on the policies of that tenant. The GUI 600 shows a tenants' list 604 and tenants' profiles 606, where the enterprise can see the tenants 106 and their patterns in the cellular network. An exemplary illustration of what the policies of a tenant might look like is also shown in the GUI 600. The mapping of the policies with the anomaly scores and threat level is also shown in Table I.

TABLE I

Risk scores and level of threat posed based on policies of the tenant of cellular network

| Policy no. | Policies of tenant 1 | Action | Policy breached | Risk score | Threat Level |
|---|---|---|---|---|---|
| 1 | Allow social media | Allow | No | 2 | Low |
| 2 | Prohibited sites | Block | Yes | 7 | High |
| 3 | File protection | Block | No | 0 | None |
| 4 | Restricted countries | Block | No | 1 | Low |
| 5 | Unsafe cloud storage | Block | Yes | 8 | High |

Traffic instances from the cellular devices 108 or the tenants 106 are scored using different scoring mechanisms. One such representation of the anomaly scores of the cellular devices 108 is shown in graphical representation 608. The horizontal axis represents the number of policies from the GUI 600 that are violated by the cellular devices 108 while vertical axis shows the anomaly scores of individual cellular devices 108 of the tenant 106. When a threshold 610 is crossed, a flag is raised for the detection of the anomaly. The management plane 202 investigates the flag further to prevent the threat from spreading across the cellular network. The remediation actions are taken for the cellular device 108 or the tenant 106 that has violated a policy. For example, in graphical representation 608, the cellular device 108 having the device ID (D_ID) H3U39 has crossed the threshold 610. The device with ID: H3U39 has breached policies number 2 and 5, which means that it has been trying to access/work on the prohibited sites and has also uploaded some company documents on unsafe cloud storage. D_ID: H3U39 has an anomaly score of 52, which is greater than the threshold value thus, the policy is violated, and the flag is generated for the device with ID: H3U39. The anomaly detection model 110 sends this flag to the management plane 202. The management plane 202 and the gateway 104 coordinate to assess the impact of the threat and take pertinent actions to remove it from the cellular network. This involves actions such as blocking or suspending the subscriber, quarantining the malicious traffic, and reporting the anomaly or threat to the tenants 106 of the cellular security system 100.

Figure 7:
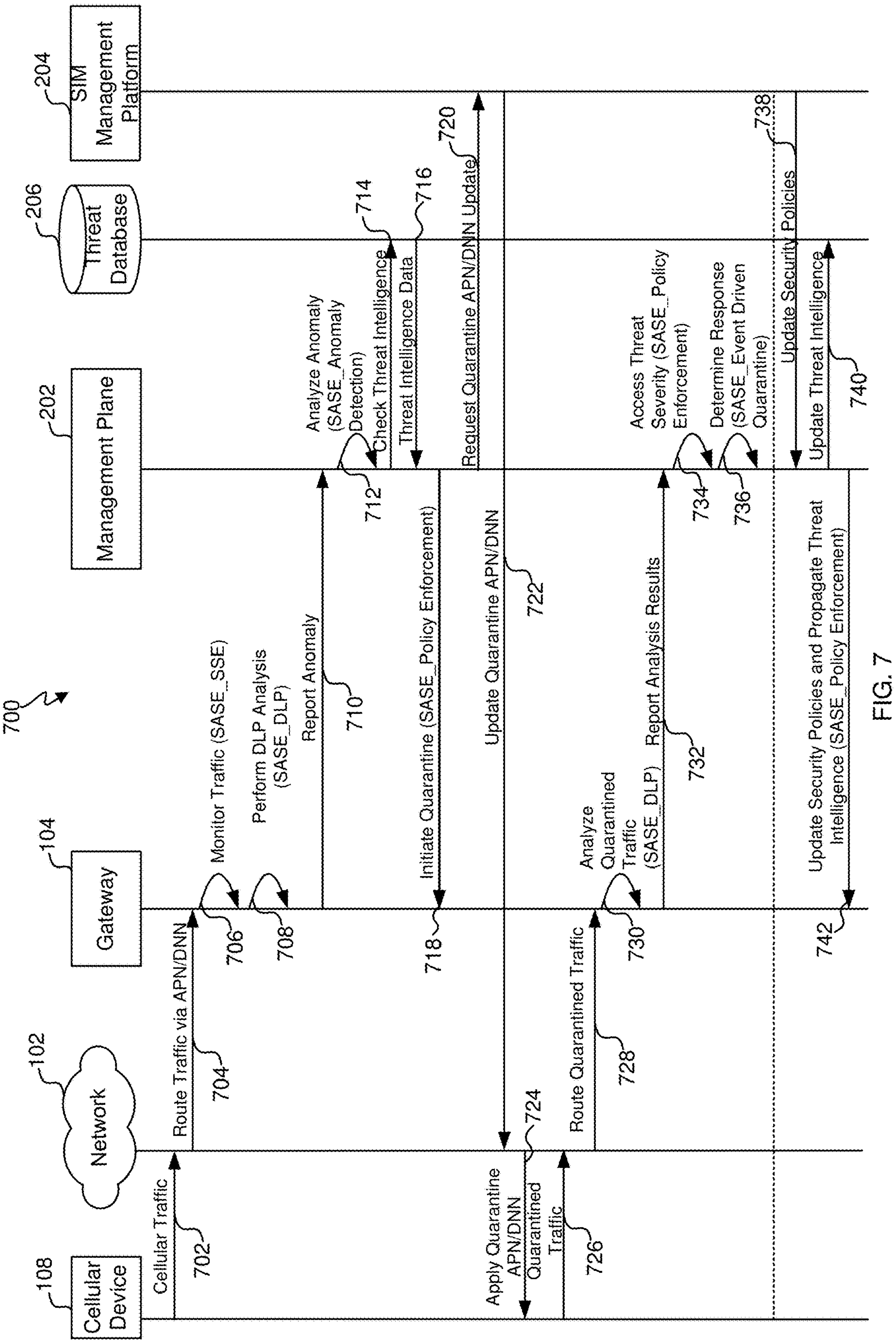
FIG. 7 illustrates a working mechanism of the cellular security system for protecting the cellular network against threats in the cloud-based environment using different policies.

Referring next to FIG. 7, a working mechanism 700 of the cellular security system 100 for protecting the cellular network against threats in the cloud-based environment using different policies is shown. The cellular security system 100 addresses the challenge of securing networks against threats originating from compromised SIM/eSIM/iSIM-enabled IoT devices. As the number and diversity of IoT/cellular devices grows, so does the risk of malicious actors exploiting vulnerabilities in these devices to launch attacks on connected networks. These attacks not just threaten individual devices but also pose a risk to the complete networks they are connected to. Traditional security measures often struggle to keep pace with the evolving threat scape, particularly in the context of cellular devices with limited processing power and resources.

The working mechanism 700 shows the main components of the cellular security system 100. At section 702, the cellular device 108 sends cellular traffic to the network 102. At section 704, the cellular traffic is routed to the distributed security gateway/the gateway 104. At section 706, the gateway 104 monitors the cellular traffic at a SASE/SSE based cloud environment. In section 708, the gateway 104 perform DLP analysis which includes capturing real-time attributes, processing the captured traffic data, and extracting relevant features from the traffic. The DLP analysis further includes performing anomaly detection for a traffic instance. For this purpose, the gateway 104 compares real-time traffic attributes/features with baseline profiles of the tenants 106 stored in threat database 206. The gateway 104 then applies anomaly detection algorithms (e.g., statistical methods, machine learning models, clustering techniques, rule-based approaches) and assigns anomaly scores to individual traffic instance of the cellular device 108. Finally, the cellular devices 108 with anomaly scores higher than a threshold are flagged.

At section 710, the gateway 104 reports the anomaly to the management plane 202 if the anomaly is detected in a traffic instance. In section 712, the management plane 202 analyzes the anomaly. In sections 714 and 716, the threat intelligence data is checked and loaded at the management plane 202. The management plane 202 correlates the anomaly with the threat intelligence data to match patterns and get confirmation of the anomaly. Once the anomaly is confirmed, the management plane 202 initiates quarantine to enforce the relevant policies at section 718.

At section 720, the management plane 202 requests the SIM management platform 204 to Update_Quarantine_APN/DNN i.e., to update the network identifiers of the quarantined traffic. In section 722, the SIM management platform 204 updates Quarantine_APN/DNN in the cellular network. In section 724, the cellular network applies the Quarantine_APN/DNN to the cellular device 108. In section 726, the cellular device 108 sends the Quarantined_traffic to the cellular network. At section 728, the cellular network routes quarantined traffic to the gateway 104. At section 730, the gateway 104 analyzes the quarantined traffic to detect any data exfiltration by the cellular device 108. If data exfiltration is detected, the gateway 104 blocks the exfiltration attempt.

In section 732, the gateway 104 reports the analysis results to the management plane 202. In section 734, the management plane 202 assesses the severity of the threat using relevant policies. In section 736, the management plane 202 determines a response for the quarantined traffic. In section 738, the SIM management platform 204 updates the security policies in the management plane 202. In section 740, the management plane 202 updates threat intelligence with new anomaly patterns in the threat database 206. Finally, in section 742, the management plane 202 updates security policies and propagates threat intelligence to the gateway 104.

Figure 8:
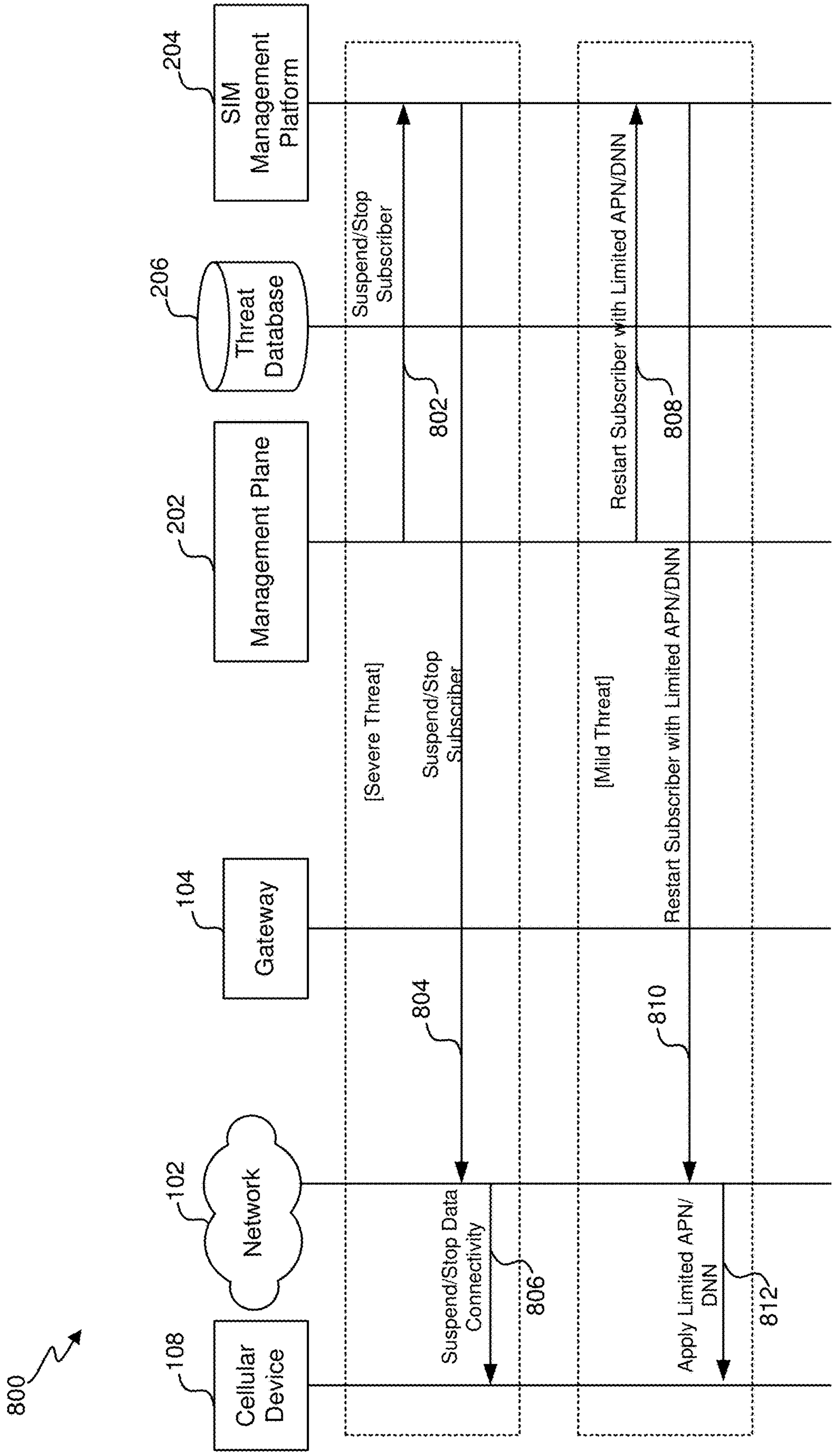
FIG. 8 illustrates remediation steps at the cellular security system in case of a severe threat and a mild threat.

Referring next to FIG. 8, remediation steps 800 at the cellular security system 100 in case of detection of a severe threat and a mild threat is shown. In case of detection of a severe threat, the management plane 202 instructs the SIM management platform 204 to suspend or stop the subscriber at section 802. In section 804, the SIM management platform 204 suspends/stops the subscriber in the cellular network. At section 806, the cellular network suspends or stops the data connectivity for the cellular device 108. In case of detection of a mild threat, the management plane 202 instructs the SIM management platform 204 to restart the subscriber with Limited APN/DNN at section 808. In section 810, the SIM management platform 204 restarts the subscriber with a Limited APN/DNN in the cellular network. In section 812, the cellular network applies Limited APN/DNN to the cellular device 108, which is restarted with limited connectivity.

Figure 9:
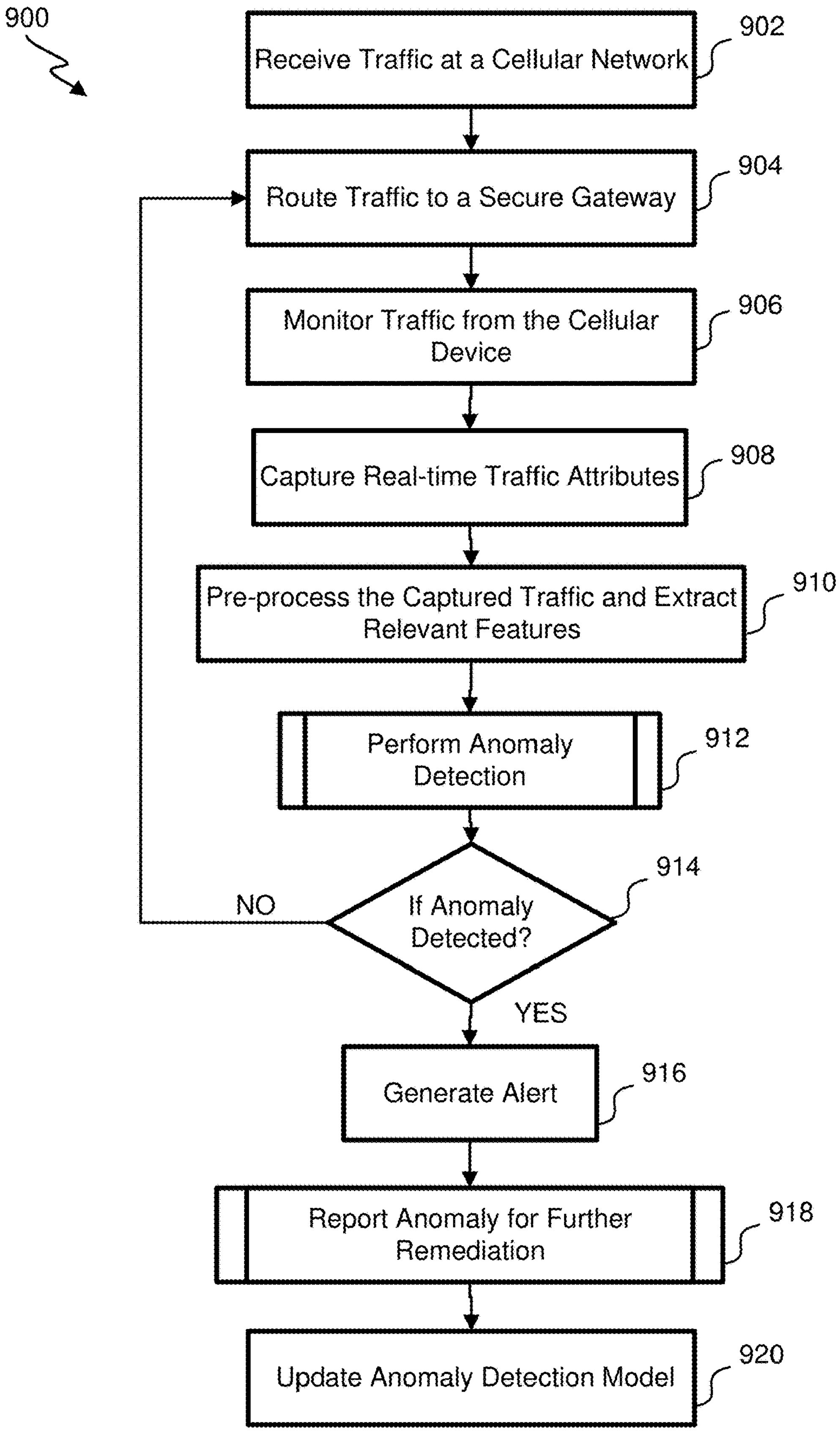
FIG. 9 illustrates a method for providing cellular security using policies to protect the cellular network against threats in a cloud-based environment.

Referring next to FIG. 9, a method for providing cellular security 900 using policies to protect the cellular network against threats in a cloud-based environment is shown. At block 902, the cellular network receives traffic from the cellular device 108. At block 904, the network 102 routes the traffic to secure gateways using the tunnels 116. The tunnels 116 of the cellular security system 100 are IPsec tunnels that are used to secure network communications. This provides a means to establish encrypted connections across public networks. Traffic incoming from different tenants remains separated in the tunnels 116.

At block 906, the gateway 104 monitors traffic incoming from the cellular device 108. At block 908, the gateway 104 of the cellular security system 100 captures real-time traffic attributes from the traffic instances. These attributes or features are used to establish patterns and create tenant profiles. By analyzing these patterns, the presence of a threat is confirmed later. The tenant profiles are used in policy enforcement while assigning anomaly scores to the cellular devices 108.

At block 910, the gateway 104 pre-processes the captured traffic data and extracts relevant features. These features are passed through different DLP modules to determine the possibility of a threat. Continuous monitoring and analyzing help the cellular security system 100 to keep up with the evolving threat landscape in a multi-tenant cloud environment.

At block 912, the gateway 104 performs anomaly detection at the cellular network. If there is no anomaly detected at block 914, the cellular security system 100 goes back to routing the new incoming traffic toward secured gateways. However, if the anomaly is detected at block 914, the anomaly detection model 110 of the cellular security system 100 raises a flag for the anomaly and generates an alert at block 916.

At block 918, the gateway 104 reports the anomaly to the management plane 202 for further remediation via the anomaly reporter 112. The management plane 202 coordinates with the SIM management platform 204 and the gateways 104 to carry out actions based on policies for preventing the spread of threats to the whole cellular network.

Finally, at block 920, the management plane 202 updates the anomaly detection model 110 by updating the threat intelligence and investigation results in the threat database 206. The anomaly detection model 110 of the cellular security system 100 is periodically updated along with the thresholds based on new traffic patterns, feedback, and evolving threat landscapes.

Figure 10:
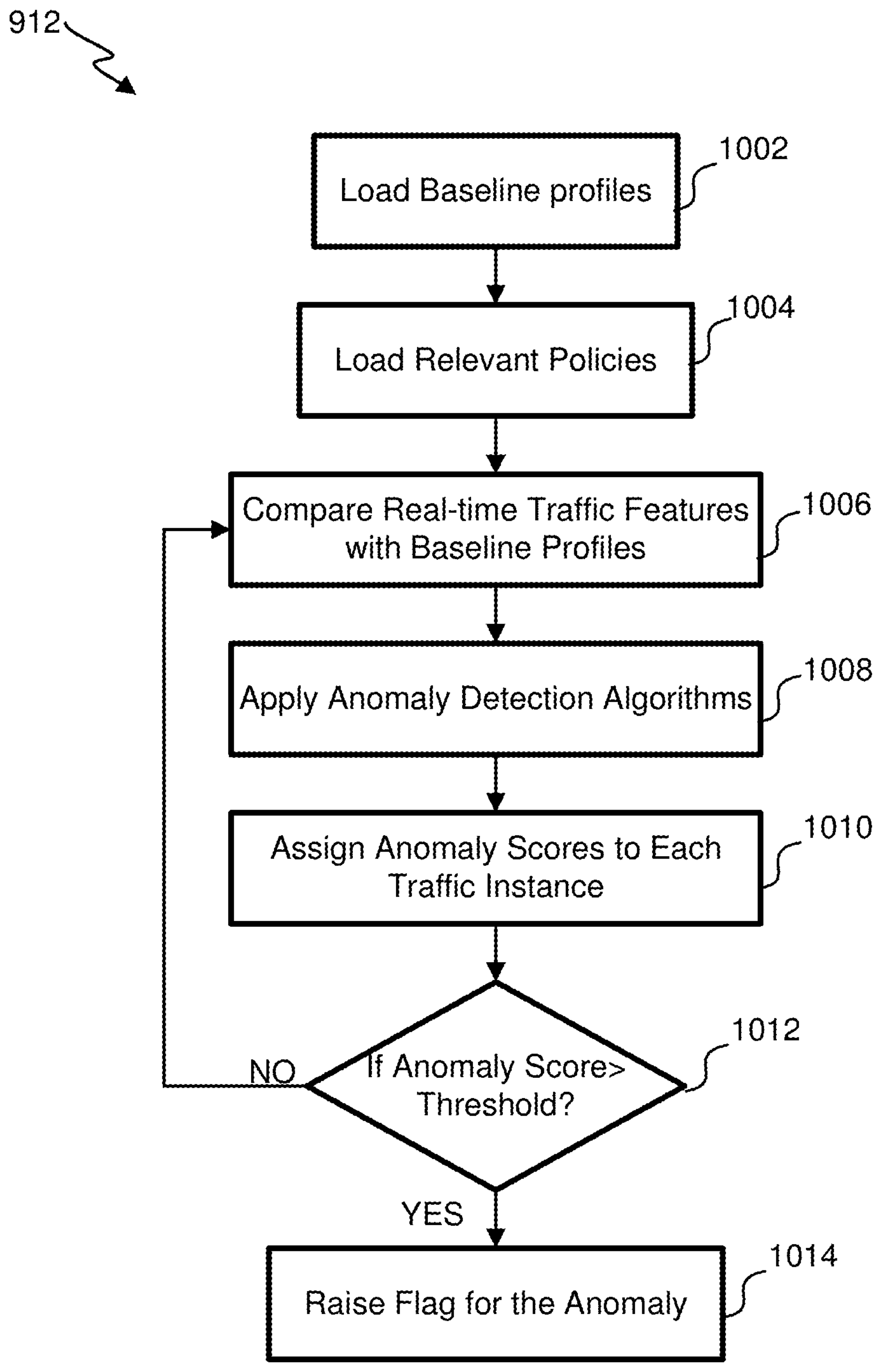
FIG. 10 illustrates an anomaly detection method of the cellular security system.

Referring next to FIG. 10, illustrates an anomaly detection method 912 of the cellular security system 100 is shown. At block 1002, the anomaly detection model 110 loads baseline profiles for the tenants 106 from the threat database 206. At block 1004, the anomaly detection model 110 loads policies related to the possible threat from the policy database 410. At block 1006, the anomaly detection model 110 compares real-time traffic features with baseline profiles of the tenants 106 stored in the threat database 206.

At block 1008, the anomaly detection model 110 applies an anomaly detection algorithm to find the malicious entity in the cellular network. Examples of anomaly detection algorithms include statistical models, machine learning algorithms, clustering techniques, and rule-based approaches etc.

At block 1010, the anomaly detection model 110 assigns anomaly scores to individual traffic instance of the cellular device 108. The anomaly scores are assigned to the cellular devices 108 based on their activity in the cellular network. If the said activity is contracting a policy or number of policies, an anomaly score is added to the profile. The higher the anomaly score, the more severe the threat is in its impact and vice versa.

At block 1012, a pre-defined threshold that is tenant-specific or user-specific is applied to determine anomalies. If the anomaly score of the cellular device 108 does not cross the threshold, the anomaly detection model 110 keeps on comparing traffic features with baseline profiles to detect a new anomaly. On the other hand, at block 1014, a flag for the anomaly is raised by the anomaly detection model 110 when the anomaly score of the cellular device 108 crosses the threshold.

Figure 11:
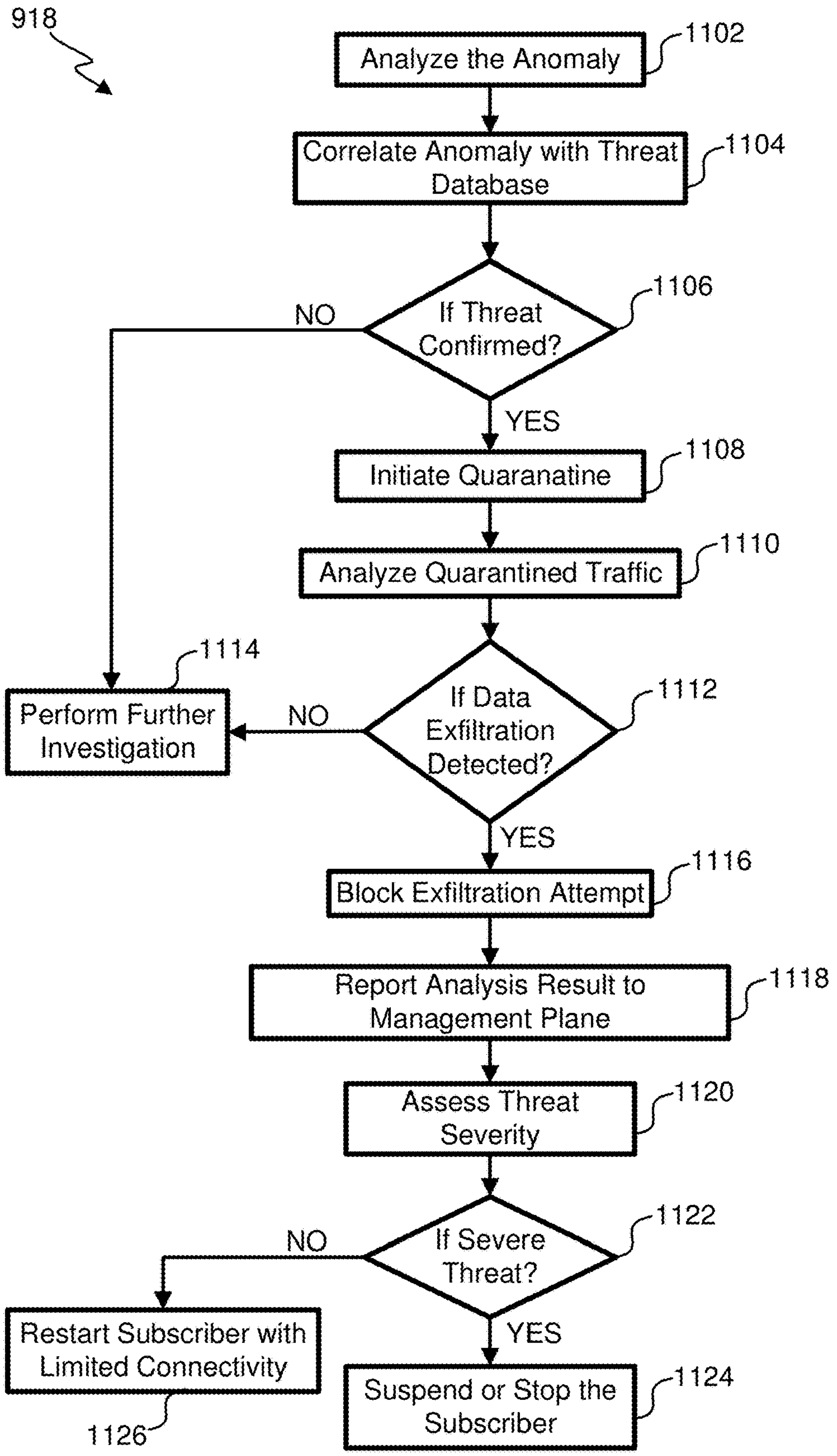
FIG. 11 illustrates a method for remediation of threat based on the severity of the threat in the cellular security system.

Referring next to FIG. 11, a method for remediation of threat 918 based on the severity of the threat in the cellular security system 100 is shown. At block 1102, the management plane 202 of the cellular security system 100 analyzes the anomaly. The management plane 202 correlates the anomaly with the threat intelligence data to match patterns and get confirmation of the anomaly at block 1104. At block 1106, the management plane 202 checks whether the threat is confirmed at the cellular network or not. If the threat is not confirmed or the flag raised by the anomaly detection model 110 turns out to be a false positive, the cellular security system 100 performs further investigations at block 1114.

Once the anomaly is confirmed, the management plane 202 initiates quarantine to enforce the relevant policies at block 1108. At block 1110, the management plane 202 separates out the quarantined traffic at the cellular network. For this purpose, the management plane 202 requests the SIM management platform 204 to Update_Quarantine_APN/DNN i.e., to update the network identifiers of the quarantined traffic. The SIM management platform 204 updates Quarantine_APN/DNN in the cellular network, and the cellular network applies the Quarantine_APN/DNN to the cellular device 108. Finally, the cellular device 108 sends the Quarantined_traffic to the cellular network, and the cellular network routes quarantined traffic to the gateway 104.

At block 1110, the gateway 104 analyzes the quarantined traffic to detect any data exfiltration by the cellular device 108. If data exfiltration is detected at block 1112, the gateway 104 blocks the exfiltration attempt at block 1116. Otherwise, if no data exfiltration is detected at block 1112, the cellular security system 100 performs further investigations at block 1114.

At block 1118, the gateway 104 reports the analysis results to the management plane 202. At block 1120, the management plane 202 assesses the severity of the threat using relevant policies. If a severe threat is detected at block 1120, the management plane 202 instructs the SIM management platform 204 to suspend or stop the subscriber at block 1124. As a result, the SIM management platform 204 suspends/stops the subscriber in the cellular network, and the cellular network suspends or stops the data connectivity for the cellular device 108. If a severe threat is not detected at block 1120 or a mild threat is detected, the management plane 202 instructs the SIM management platform 204 to restart the subscriber with limited APN/DNN at block 1126. As a result, the SIM management platform 204 restarts the subscriber with limited APN/DNN in the cellular network, and the cellular network applies limited APN/DNN to the cellular device 108. Thus, the cellular device 108 is restarted with limited connectivity in the cellular network.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

We claim:

1. A cellular security system driven by a plurality of policies to protect a cellular network of a plurality of cellular networks against a plurality of threats in a cloud-based environment, the cellular security system comprises one or more hardware processors with code for:

- a tenant of a plurality of tenants using the plurality of cellular networks, the tenant includes a plurality of cellular devices;
- a plurality of tunnels between a cellular device of the plurality of cellular devices and the cellular network, the plurality of tunnels is operable to:
  - receive traffic from the cellular device at the cellular network;
  - route the traffic to a gateway using a plurality of network identifiers;
  - monitor the traffic from the cellular device at the gateway; and
  - capture real-time traffic attributes and extract a plurality of relevant features;
  - an anomaly detection model to detect the plurality of threats in the cloud-based environment, wherein the anomaly detection model is operable to:
    - retrieve a plurality of baseline profiles from a threat database,
    - load the plurality of policies related to a threat of the plurality of threats,
    - compare real-time traffic features with the plurality of baseline profiles,
    - apply an anomaly detection algorithm to a traffic instance,
    - assign an anomaly score to the traffic instance,
    - determine whether the anomaly score is greater than a threshold to detect an anomaly, and
    - raise a flag for detection of the anomaly;
    - an alert generator to send an alert to the tenant in the cloud-based environment; and
    - an anomaly reporter to notify a management plane for a remediation of the anomaly, wherein the anomaly is remediated at the management plane and the management plane is operable to:
      - analyze the anomaly, correlate the anomaly with the threat database and get confirmation of the threat, initiate a quarantined traffic by a quarantined traffic module upon confirmation of the threat, wherein the quarantined traffic module enables a security action based on a threat level of the threat, and initiates an isolation of the cellular device affected from the threat based on the threat level of either suspension at the cellular network or limiting connectivity, send a request to update a network identifier for the quarantined traffic, assess severity of the threat, update the threat database with new anomaly patterns and results in real-time based on new traffic patterns, feedback, and evolving threat, and periodically update the anomaly detection algorithm used by the anomaly detection model based on the updated threat database.

2. The cellular security system of claim 1, wherein the anomaly is remediated at the management plane, and the management plane is further operable to:

get a subscriber suspended at the cellular network upon detection of a severe threat; and get the subscriber restarted with limited connectivity at the cellular network upon detection of a mild threat.

3. The cellular security system of claim 2, wherein the severe threat and the mild threat indicate the threat level of the threat.

4. The cellular security system of claim 1, wherein the cellular security system, upon initiating a quarantined traffic, is further operable to:

update the network identifier of the quarantined traffic at the cellular network;

apply the network identifier of the quarantined traffic to the cellular device;

receive the quarantined traffic from the cellular device at the cellular network; and route the quarantined traffic to the gateway.

5. The cellular security system of claim 1, wherein the gateway is further operable to:

receive a quarantined traffic from the cellular device at the cellular network;

analyze the quarantined traffic;

upon detection of an exfiltration attempt, block the exfiltration attempt; and report an analysis of the exfiltration attempt to the management plane.

6. The cellular security system of claim 1, wherein the plurality of baseline profiles is created by analyzing the plurality of policies, traffic patterns, and device types associated with the plurality of tenants.

7. The cellular security system of claim 1, wherein the quarantined traffic module dynamically adjusts the plurality of policies and enforces isolation measures based on the threat level.

8. A method for providing cellular security using a plurality of policies to protect a cellular network against a plurality of threats in a cloud-based environment, the method for providing cellular security using one or more hardware processors, comprising:

receiving traffic from a cellular device at the cellular network;

routing the traffic to a gateway using a plurality of network identifiers;

monitoring the traffic from the cellular device at the gateway;

capturing real-time traffic attributes and extracting a plurality of relevant features;

detecting the plurality of threats using an anomaly detection model, wherein the anomaly detection model is operable to:

retrieve a plurality of baseline profiles from a threat database, load the plurality of policies related to a threat of the plurality of threats, compare real-time traffic features with the plurality of baseline profiles, apply an anomaly detection algorithm to a traffic instance, assign an anomaly score to the traffic instance, and determine whether the anomaly score is greater than a threshold to detect an anomaly, raising a flag for detection of the anomaly;

generating an alert to notify a tenant in the cloud-based environment upon detecting the anomaly, wherein the anomaly is remediated at a management plane and the management plane is operable to:

analyze the anomaly, correlate the anomaly with the threat database and get confirmation of the threat, initiate a quarantined traffic by a quarantined traffic module upon confirmation of the threat, wherein the quarantined traffic module enables a security action based on a threat level of the threat, and initiates an isolation of the cellular device affected from the threat based on the threat level of either suspension at the cellular network or limiting connectivity, send a request to update a network identifier for the quarantined traffic, assess severity of the threat, update the threat database with new anomaly patterns and results in real-time based on new traffic patterns, feedback, and evolving threat, and periodically update the anomaly detection algorithm used by the anomaly detection model based on the updated threat database.

9. The method for providing cellular security of claim 8, wherein the anomaly is remediated at the management plane, and the management plane is further operable to:

getting a subscriber suspended at the cellular network upon detection of a severe threat; and getting the subscriber restarted with limited connectivity at the cellular network upon detection of a mild threat.

10. The method for providing cellular security of claim 9, wherein the severe threat and the mild threat indicate the threat level of the threat.

11. The method for providing cellular security of claim 8, wherein the management plane, upon initiating a quarantined traffic, is further operable to:

update the network identifier of the quarantined traffic at the cellular network;

apply the network identifier of the quarantined traffic to the cellular device;

receive the quarantined traffic from the cellular device at the cellular network; and route the quarantined traffic to the gateway.

12. The method for providing cellular security of claim 8, wherein the gateway is further operable to:

receiving a quarantined traffic from the cellular device at the cellular network;

analyzing the quarantined traffic;

upon detection of an exfiltration attempt, block the exfiltration attempt; and reporting an analysis of the exfiltration attempt to the management plane.

13. The method for providing cellular security of claim 8, wherein the plurality of baseline profiles is created by analyzing the plurality of policies, traffic patterns, and device types associated with a plurality of tenants.

14. The method for providing cellular security of claim 8, wherein the quarantined traffic module dynamically adjusts the plurality of policies and enforces isolation measures based on the threat level.

15. A non-transitory computer-readable media having computer-executable instructions embodied thereon that, when executed by one or more processors, facilitate a method for providing cellular security using a plurality of policies to protect a cellular network against a plurality of threats in a cloud-based environment, the method for providing cellular security comprising:

receiving traffic from a cellular device at the cellular network;

routing the traffic to a gateway using a plurality of network identifiers;

monitoring the traffic from the cellular device at the gateway;

capturing real-time traffic attributes and extracting a plurality of relevant features;

detecting the plurality of threats using an anomaly detection model, wherein the anomaly detection model is operable to:

retrieve a plurality of baseline profiles from a threat database, load the plurality of policies related to a threat of the plurality of threats, compare real-time traffic features with the plurality of baseline profiles, apply an anomaly detection algorithm to a traffic instance, assign an anomaly score to the traffic instance, and determine whether the anomaly score is greater than a threshold to detect an anomaly, raising a flag for detection of the anomaly;

generating an alert to notify a tenant in the cloud-based environment upon detecting the anomaly, wherein the anomaly is remediated at a management plane and the management plane is operable to:

analyze the anomaly, correlate the anomaly with the threat database and get confirmation of the threat, initiate a quarantined traffic by a quarantined traffic module upon confirmation of the threat, wherein the quarantined traffic module enables a security action based on a threat level of the threat, and initiates an isolation of the cellular device affected from the threat based on the threat level of either suspension at the cellular network or limiting connectivity, send a request to update a network identifier for the quarantined traffic, assess severity of the threat, update the threat database with new anomaly patterns and results in real-time based on new traffic patterns, feedback, and evolving threat, and periodically update the anomaly detection algorithm used by the anomaly detection model based on the updated threat database.

16. The non-transitory computer-readable media of claim 15, wherein the anomaly is remediated at the management plane, and the management plane is further operable to:

getting a subscriber suspended at the cellular network upon detection of a severe threat; and getting the subscriber restarted with limited connectivity at the cellular network upon detection of a mild threat.

17. The non-transitory computer-readable media of claim 16, wherein the severe threat and the mild threat indicate the threat level of the threat.

18. The non-transitory computer-readable media of claim 15, wherein the cellular security system, upon initiating a quarantined traffic, is further operable to:

updating the network identifier of the quarantined traffic at the cellular network;

applying the network identifier of the quarantined traffic to the cellular device;

receiving the quarantined traffic from the cellular device at the cellular network; and routing the quarantined traffic to the gateway.

19. The non-transitory computer-readable media of claim 15, wherein the gateway is further operable to:

receiving a quarantined traffic from the cellular device at the cellular network;

analyzing the quarantined traffic;

upon detection of an exfiltration attempt, block the exfiltration attempt; and reporting an analysis of the exfiltration attempt to the management plane.

20. The non-transitory computer-readable media of claim 15, wherein the quarantined traffic module dynamically adjusts the plurality of policies and enforces isolation measures based on the threat level.

* * * * *